United States Patent [19]

Parks

[11] Patent Number: 5,725,917

[45] Date of Patent: Mar. 10, 1998

[54] BARRIER LAMINATE WITH IMPROVED INTERLAYER ADHESION

[75] Inventor: Christopher J. Parks, Ellicott City, Md.

[73] Assignee: WESTVACO Corporation, New York, N.Y.

[21] Appl. No.: 595,560

[22] Filed: Feb. 1, 1996

[51] Int. Cl.[6] ............................ B32B 7/12; B32B 23/06
[52] U.S. Cl. ............... 428/34.2; 428/34.1; 428/34.2; 428/475.8; 428/476.1; 428/479.6; 428/513; 229/3.1; 229/3.5 R
[58] Field of Search .................. 428/34.2, 36.7, 428/341, 347, 351, 354, 355, 475.8, 476.1, 479.6, 342, 511, 513; 229/3.1, 3.5 R

[56] References Cited

U.S. PATENT DOCUMENTS

| | | | |
|---|---|---|---|
| 4,233,367 | 11/1980 | Ticknor et al. | 428/476.3 |
| 4,859,513 | 8/1989 | Gibbons et al. | 428/34.2 |
| 5,116,649 | 5/1992 | Massouda | 428/34.2 |
| 5,141,801 | 8/1992 | Takeshita et al. | 428/476.1 |
| 5,175,036 | 12/1992 | Smiley et al. | 428/36.7 |
| 5,324,528 | 6/1994 | Wright et al. | 426/324 |
| 5,413,845 | 5/1995 | Lofgren et al. | 428/215 |
| 5,525,672 | 6/1996 | Jones | 525/80 |

*Primary Examiner*—Rena Dye

[57] ABSTRACT

A non-foil barrier laminate having improved structural integrity comprises a combination of paperboard, heat-sealable layers and an oxygen barrier layer wherein the oxygen barrier layer is sandwiched between tie layers formed from an anhydride-modified linear low density polyethylene material.

9 Claims, No Drawings

BARRIER LAMINATE WITH IMPROVED INTERLAYER ADHESION

BACKGROUND OF INVENTION

The present invention relates to barrier laminates and containers made therefrom. More particularly, the invention relates to non-foil barrier laminates useful for making containers which hold liquids containing essential oils and flavors such as fruit juices. Barrier laminates to satisfy the present invention must have good oxygen barrier characteristics (i.e., low oxygen permeability), to protect the contents of the containers made from such laminates against the loss of essential oils, flavors, and vitamins. In addition, the laminates must have good moisture resistance so that the containers may withstand changes in relative humidity. The barrier laminates must also be capable of being heat sealed on conventional heat sealing equipment in the manufacture, filling and sealing processes.

Paperboard coated with low density polyethylene (LDPE) has been used in the past for such containers, and while it possesses the requisite moisture barrier properties and heat sealing ability, it does not provide acceptable gas barrier properties. Thus, in order to achieve the desirable gas barrier properties in such structures, additional barrier materials must be added. In the family of barrier materials available, those frequently used include ethylene vinyl alcohol copolymers, polyvinylidene chloride and its copolymers, polyacrylonitrile and its copolymers, polyamides, polyethylene terephthalate, polyvinyl chloride and polypropylene.

In particular, polyamides such as nylon, and specifically amorphous nylon, have been found to be highly desirable oxygen barrier materials for such laminates. However, attempts to combine amorphous nylon with other layers including heat-sealable polymers such as LDPE, have not always met with success since amorphous nylon is a difficult material with which to form strong interlayer bonds. In fact, with the preferred barrier laminate of the present invention, which incorporates an oxygen barrier layer of SELAR PA, an amorphous nylon supplied by the Dupont Chemical Company, experience has demonstrated that the weakest bonds in the structure are the bonds between the tie layers used and the barrier material. Notwithstanding, in accordance with the present invention, a new tie layer material has been discovered that provides superior performance in achieving satisfactory interlayer adhesion, particularly when used in combination with amorphous nylon as the oxygen barrier material. Factors such as choice of materials, processing temperatures and layer thicknesses can all affect adhesion within a coextrusion. The present invention deals with the choice of materials.

SUMMARY OF INVENTION

It is an object of the present invention to provide an improved, heat-sealable, non-foil barrier laminate for fruit or citrus juices, beverages and the like which is more economical than prior art laminates, and which provides more reliable performance in use. More particularly, it is an object of the present invention to provide a barrier laminate including a combination of paperboard and polymeric materials which has stronger and more reliable interlayer bonds than prior laminates. Toward this end, the present invention is directed to the use of a tie layer material previously not disclosed in the literature for use in barrier laminate structures of the type disclosed herein.

In the preferred embodiment of the present invention, the performance of an existing commercial structure has been improved by substituting an anhydride-modified linear low density polyethylene tie layer material from Quantum Chemicals (PLEXAR 5125), for the previously used tie layer material, an anhydride-modified low density polyethylene from Dupont Chemical Company (BYNEL E388). Based on an extensive investigation, it was discovered that the weakest bond in the commercial structure:

LDPE/Paperboard/LDPE/tie/Nylon/tie/LDPE/LDPE was often between the tie layer and the nylon layer. It was discovered that inadequate adhesion between these layers could lead to delamination of the structure during the converting, filling and sealing operations. It was further discovered that while an inseparable bond was not necessary, at least a minimum adhesive level was necessary to achieve a reliable structure.

Factors such as processing temperatures, and layer thicknesses can affect adhesion between layers in a coextrusion. For example, increasing the tie layer temperature can improve interlayer adhesion, and, while there is no minimum thickness needed for a tie layer, a thicker layer within the coextrusion may result in better interlayer adhesion due to thermal effects. Nevertheless, it was surprising to discover that switching from a conventional anhydride modified low density polyethylene based tie layer to an anhydride modified linear low density polyethylene based tie layer could produce the results obtained herein. The mechanism that provides the improved performance is not completely understood, however it is known that linear low density polyethylene (LLDPE) is a copolymer of ethylene with an alpha-olefin, e.g., butene, hexene, or octene. Thus, LLDPE is designed to simulate the short-chain branching and density of low density polyethylene (LDPE) without the occurrence of long-chain branching. This provides LLDPE with several advantages over LDPE, including twice the hot tack strength, greater toughness, higher tensile strength, and improved heat seal strength despite the fact that the adhesion chemistry of LLDPE is identical to that of LDPE. Accordingly, it has been discovered in accordance with the present invention that an LLDPE based tie layer will adhere to an amorphous nylon barrier material and provide a barrier laminate having greater integrity than prior art structures which used conventional LDPE based tie layers.

DETAILED DESCRIPTION

In the commercial juice carton structure:

LDPE/paperboard/LDPE/tie/Nylon/tie/LDPE/LDPE the weakest bonds occur between the nylon and the tie layers. This was confirmed in a trial in which four different tie layer materials were evaluated. The different tie layer materials were incorporated in the five layer coextrusion LDPE/tie/Nylon/tie/LDPE, and applied to milk carton stock (conventional 260 lbs/ream paperboard used for half-gallon milk cartons), using commercial coextrusion equipment. Based on this trial, PLEXAR 5125, an anhydride-modified linear low density polyethylene from Quantum Chemical Company, provided adhesion superior to that provided by BYNEL E388, the previously used anhydride-modified low density polyethylene from Dupont Chemical Company. In addition, BYNEL E406, a low density polyethylene based material with a higher anhydride content than E388 was found to be slightly better than E388, and PLEXAR 175, an anhydride modified low density polyethylene from Quantuam Chemical Company was found to be the least desirable. The same temperature profiles were used for each trial condition on the coextruder, the paperboard was flame treated before coextrusion in a conventional manner, and a matte finish chill roll was used to set the coextruded sandwich. Target coat weights for each condition are summarized in Table I below. For the BYNEL E388 and PLEXAR 5125 conditions, the effect of decreasing the coat weight slightly was investigated as was the effect of decreasing the total coat weight of the coextruded sandwich structure.

TABLE I

Trial Conditions - Target Coat Weights

| Roll Number | tie layer | LDPE/tie/nylon/tie/LDPE (lbs./3000 sq. ft.) |
| --- | --- | --- |
| 99/100 | Plexar 175 | 6/4/6/4/6 |
| 101/102 | Plexar 5125 | 6/4/6/4/6 |
| 103 | Plexar 5125 | 6/3/6/3/6 |
| 104 | Plexar 5125 | 5/3/5/3/5 |
| 106/107 | Bynel E388 | 6/4/6/4/6 |
| 108 | Bynel E388 | 6/3/6/3/6 |
| 109 | Bynel E388 | 5/3/5/3/5 |
| 110/111 | Bynel E406 | 6/4/6/4/6 |

After coextrusion, the coat weights were measured gravimetrically and compared with the targets. As shown in Table II, the measured coat weights were found to be considerably higher than the targets.

TABLE II

Target and Measured Coat Weights

| Roll Number | Target Coat Weight (lbs./3000 sq. ft.) | Measured Coat Weight (lbs./3000 sq. ft.) |
| --- | --- | --- |
| 99 | 26 | 37.3 |
| 102 | 26 | 38.2 |
| 103 | 24 | 34.9 |
| 104 | 21 | 31.6 |
| 106 | 26 | 35.3 |
| 108 | 24 | 34.5 |
| 109 | 21 | 30.1 |
| 110 | 26 | 36.2 |

In addition, cross-sections of each trial condition were prepared to look at the layer distribution within the structure. Table III shows the estimated coat weights for each condition taken from the cross sectional photographs.

TABLE III

Estimated Coat Weights

| Roll Number | LDPE + tie (lbs./3000 ft.$^2$) | nylon (lbs./3000 ft.$^2$) | LDPE + tie (lbs./3000 ft.$^2$) | total (lbs./3000 ft.$^2$) |
| --- | --- | --- | --- | --- |
| 99 | 12.6 | 9.8 | 12.6 | 35.0 |
| 102 | 12.6 | 9.8 | 12.6 | 35.0 |
| 103 | 12.6 | 9.8 | 9.0 | 31.4 |
| 104 | 10.8 | 9.8 | 10.8 | 31.4 |
| 106 | 12.6 | 9.8 | 12.6 | 35.0 |
| 108 | 10.8 | 9.8 | 10.8 | 31.4 |
| 109 | 9.0 | 9.8 | 10.8 | 29.6 |
| 110 | 12.6 | 9.8 | 10.8 | 33.2 |

The estimated coat weights taken from the cross-sectional photographs proved to be in fairly good agreement with the coat weights measured gravimetrically. Part of the difference between the targets and the coat weights measured and estimated was attributed to the fact that the nylon layer was about 4 lbs/ream higher than the target. Also, the tie layer coat weights appeared to be slightly higher than the target. Nevertheless, it was anticipated that the slightly higher tie layer coat weights could result in better adhesion than the commercial product. Thus the trial conditions were deemed to be appropriate for testing. For this purpose, a test procedure was developed for quantitatively determining the interlayer adhesion between the tie layers and nylon barrier layer.

Trial samples were prepared for each condition by first heat sealing all but one end of a 4-mil thick piece of polyethylene film to the surface of the laminate structure having the coextruded sandwich thereon. The opposite surface of the laminate structure having only polyethylene coated thereon was positioned toward the top sealer jaw (heat source) so as not to affect interlayer adhesion. Sample dimensions were approximately 1×8 inches. Sheets of MYLAR were used between the polyethylene coated surface and sealer jaw to prevent sticking. Sealer conditions were 305° F., 60 psi jaw pressure and 2 seconds dwell time. After allowing these heat sealed trial samples to equilibrate at 50% RH and 72° F. overnight, a slip/peel tester manufactured under the name Instrumentors, Inc. was used to measure adhesion. Peeling was done by placing one end of the laminate structure in the movable jaws of the test instrument and the free end of the 4-mil thick polyethylene film in the fixed jaws of the instrument. The test instrument was then operated in an attempt to peel the polyethylene film from the laminate structure at an angle of 90 degrees with respect to the laminate structure. The test was performed at the slow speed setting and with 50 second averging. Both peak and average peel strengths were recorded.

While it is recognized that the slip/peel test does not reproduce actual use conditions, it has been found to be useful in demonstrating differences in interlayer adhesion. The average and peak peel strengths observed and measured for each of the trial conditions are reproduced in Table IV.

TABLE IV

Peel Test Results

| roll number | peak (grams) | average (grams) |
| --- | --- | --- |
| 99 | 905 ± 277 | 252 ± 31 |
| 102 | fiber tear | fiber tear |
| 103 | fiber tear | fiber tear |
| 104 | fiber tear | fiber tear |
| 106 | 1107 ± 291 | 577 ± 43 |
| 108 | 977 ± 123 | 511 ± 64 |
| 109 | 956 ± 185 | 489 ± 16 |
| 110 | 1125 ± 115 | 727 ± 87 |

From the data in Table IV, it will be seen that interlayer bonds were ruptured between the nylon barrier layer and one of the tie layers in each of the conditions identified as 99 and 106-110. Trial condition number 99 with PLEXAR 175, an LDPE based tie layer, had the weakest interlayer bond between the tie layer and the amorphous nylon barrier layer. Meanwhile, trial condition 102 having substantially the same coat weight as condition 99, but with the LLDPE based tie layer material PLEXAR 5125 achieved fiber tear of the paperboard substrate. That is, the interlayer bond strength between the amorphous nylon barrier layer and the tie layers was greater than the internal strength of the paperboard. Likewise conditions 103 and 104, which also include Plexar 5125 as the tie layer material, also achieved fiber tear of the paperboard substrate, even at a lower total coat weight than condition 102. Finally conditions 106, 108 and 109, which used BYNEL E388 an LDPE based tie layer material each suffered rupture at the barrier layer/tie layer interface, and thus were substantially equivalent in interlayer strength. Meanwhile condition 110, with BYNEL E406, another LDPE based tie layer material, was slightly better. In general, fiber tear was not achieved until a load of about 1200 grams on the slip/peel tester was achieved. These data demonstrate the utility and effectiveness of the present invention as being successful to achieve stronger interlayer bonds with a tie layer based on LLDPE rather than the conventional LDPE based tie layer materials.

While the present invention has been illustrated and described in connection with a barrier laminate structure including a single oxygen barrier layer sandwiched between two tie layers and two heat-sealable layers, it is not intended to be so limited. Various modifications and structural changes including multiple tie layers and multiple oxygen barrier layers could be made without departing in any way from the scope and spirit of the present invention.

What is claimed is:

1. A container having an outer surface and an inner product contact surface prepared from a laminate consisting essentially of:
   (a) a paperboard substrate;
   (b) a layer of heat-sealable olefin polymer on one side of the paperboard substrate to provide the outer surface of the container;
   (c) an inner sandwich layer on the other side of the paperboard substrate comprising, in sequence, from the paperboard, a first tie layer, an amorphous nylon oxygen barrier layer, and a second tie layer; and,
   (d) an inner layer of a heat-sealable olefin polymer on the same side of the paperboard as the inner sandwich layer inwardly from the sandwich layer, to provide the inner product contact surface of the container;
   (e) wherein the first and second tie layers consist of an anhydride-modified linear low density polyethylene copolymer to provide enhanced interlayer adhesion.

2. A container according to claim 1 wherein the inner sandwich layer comprises, in sequence, from the paperboard, a first low density polyethylene polymer layer, the first tie layer, the amorphous nylon layer, the second tie layer, and a second low density polyethylene layer.

3. A container according to claim 2 wherein the coat weights of the inner sandwich layer comprise 2–8 lbs/ream low density polyethylene, 2–6 lbs/ream tie layer, 4–12 lbs/ream amorphous nylon, 2–6 lbs/ream tie layer, and 2–8 lbs/ream low density polyethylene.

4. A container according to claim 3 wherein the inner sandwich layer is coextruded and the inner product contact layer of the container is a separate layer coated on the sandwich layer comprising 5–15 lbs/ream of low density polyethylene, and the layer of olefin polymer providing the outer surface of the container comprises 6–18 lbs/ream of low density polyethylene.

5. A non-foil, barrier laminate consisting essentially of:
   (a) a paperboard substrate;
   (b) an outer layer of a heat-sealable olefin polymer on one side of the paperboard substrate;
   (c) an inner sandwich layer on the other side of the paperboard substrate comprising, in sequence, from the paperboard, a first tie layer, an amorphous nylon oxygen barrier layer, and a second tie layer; and,
   (d) an inner layer of a heat-sealable olefin on the same side of the paperboard as the inner sandwich layer inwardly from the sandwich layer;
   (e) wherein the first and second tie layers consist of an anhydride-modified linear low density polyethylene copolymer to provide enhanced interlayer adhesion.

6. A laminate according to claim 5 wherein the inner sandwich layer comprises, in sequence, from the paperboard, a low density polyethylene polymer layer, the first tie layer, the amorphous nylon layer, the second tie layer, and another low density polyethylene layer.

7. A laminate according to claim 6 wherein the coat weights of the inner sandwich layer comprise 2–8 lbs/ream low density polyethylene, 2–6 lbs/ream tie layer, 4–12 lbs/ream amorphous nylon, 2–6 lbs/ream tie layer, and 2–8 lbs/ream low density polyethylene.

8. A laminate according to claim 7 wherein the sandwich layer is coextruded and the inner layer comprises 5–15 lbs/ream of low density polyethylene coated on the sandwich layer.

9. A laminate according to claim 8 wherein the outer layer of olefin polymer comprises 6–18 lbs/ream of low density polyethylene.

* * * * *